US011280263B2

(12) United States Patent
Heinbuch et al.

(10) Patent No.: US 11,280,263 B2
(45) Date of Patent: Mar. 22, 2022

(54) TORQUE-ACTUATED VARIABLE COMPRESSION RATIO PHASER

(71) Applicant: GM GLOBAL TECHNOLOGY OPERATIONS LLC, Detroit, MI (US)

(72) Inventors: Ryan M. Heinbuch, Commerce Township, MI (US); Justin E. Ketterer, LaSalle (CA); Rodney E. Baker, Fenton, MI (US); Dumitru Puiu, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/863,549

(22) Filed: Apr. 30, 2020

(65) Prior Publication Data

US 2021/0340904 A1 Nov. 4, 2021

(51) Int. Cl.

| | |
|---|---|
| ***F02D 15/02*** | (2006.01) |
| ***F02B 75/00*** | (2006.01) |
| ***F16C 3/06*** | (2006.01) |
| ***F02B 75/04*** | (2006.01) |
| ***F01L 13/00*** | (2006.01) |
| ***F01L 1/344*** | (2006.01) |

(52) U.S. Cl.

CPC .......... *F02B 75/047* (2013.01); *F01L 1/3442* (2013.01); *F01L 13/0015* (2013.01); *F01L 2001/34426* (2013.01)

(58) Field of Classification Search

CPC ........... F02D 15/02; F02B 75/048; F16C 3/06

See application file for complete search history.

(56) References Cited

U.S. PATENT DOCUMENTS

| | | | | |
|---|---|---|---|---|
| 8,794,200 | B2 | 8/2014 | Jacques et al. | |
| 10,428,863 | B2 | 10/2019 | Zahdeh | |
| 2009/0241910 | A1* | 10/2009 | Shin | F02D 15/02 123/48 B |
| 2010/0006069 | A1* | 1/2010 | Yoshikawa | F02B 75/048 123/48 B |
| 2017/0254260 | A1* | 9/2017 | Yamada | F02B 75/04 |
| 2018/0223730 | A1* | 8/2018 | Suda | F02B 75/04 |
| 2018/0274437 | A1* | 9/2018 | Shoji | F02D 15/02 |
| 2019/0186311 | A1* | 6/2019 | Nagai | F16H 49/001 |

FOREIGN PATENT DOCUMENTS

| | | | |
|---|---|---|---|
| DE | 102014201979 | A1 | 8/2015 |
| EP | 2022959 | A2 | 2/2009 |

OTHER PUBLICATIONS

U.S. Appl. No. 16/266,809, filed Feb. 4, 2019, Heinbuch et al.
U.S. Appl. No. 16/850,461, filed Apr. 16, 2020, Heinbuch et al.
Office Action dated Nov. 9, 2021 from German Patent Office for German Patent Application No. 10 2021 106 921.1, 8 pages.

* cited by examiner

*Primary Examiner* — Long T Tran

(57) ABSTRACT

A variable compression ratio (VCR) phaser configured to control a compression ratio of an engine having a crankshaft and a control shaft. The variable compress ratio phaser comprises: i) a control shaft gear configured to mesh with a gear on the control shaft of the engine and to receive torque from the control shaft; ii) a crankshaft gear configured to mesh with a gear on the crankshaft of the engine and to deliver torque to the crankshaft; and iii) a torque conversion mechanism configured to receive torque from the control shaft and to convert the torque to a linear force that changes the compression ratio of the engine.

13 Claims, 4 Drawing Sheets

TORQUE-ACTUATED VARIABLE COMPRESSION RATIO PHASER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a vehicle engine that include a gearbox for varying the compression ratio of the vehicle engine using a torque-actuated variable compression ratio (VCR) phaser. A variable compression ratio (VCR) engine typically includes an engine block that incorporates a plurality of cylinders, a piston disposed within each of the cylinders, connecting rods, a crankshaft, a bell crank, control links, a control shaft, and a gearbox. The bell crank is pivotally mounted on the crankshaft. The connecting rod connects the piston to one end of the bell crank. The control link connects the other end of the bell crank to the control shaft.

As each piston moves within a cylinder, the corresponding connecting rod applies a torque to the bell crank. The control link in turn transfers the torque from the bell crank to the control shaft, thereby causing the control shaft to rotate. The gearbox transfers torque from the control shaft back to the crankshaft and ensures that rotation of the two shafts is in time (or in phase). In addition, the gearbox couples an actuator—typically an electric motor or a hydraulic pump—to the control shaft. The actuator varies the speed of the control shaft relative to the speed of the crankshaft, and thereby varies the compression ratio of the cylinder.

SUMMARY

It is an object of the disclosure to provide a variable compression ratio (VCR) phaser configured to control a compression ratio of an engine having a crankshaft and a control shaft. The variable compress ratio phaser comprises: i) a control shaft gear configured to mesh with a gear on the control shaft of the engine and to receive torque from the control shaft; ii) a crankshaft gear configured to mesh with a gear on the crankshaft of the engine and to deliver torque to the crankshaft; and iii) a torque conversion mechanism configured to receive torque from the control shaft and to convert the torque to a linear force that changes the compression ratio of the engine.

In one embodiment, the linear force from the torque conversion mechanism phases the control shaft relative to the crankshaft to thereby increase or decrease the compression ratio of the engine.

In another embodiment, the linear force from the torque conversion mechanism adjusts a phase angle between the crankshaft gear and the control shaft gear to thereby increase or decrease the compression ratio of the engine.

In still another embodiment, the torque conversion mechanism comprises a first shaft on which the control shaft gear is mounted, the first shaft configured to rotate with the control shaft gear.

In yet another embodiment, the first shaft on which the control shaft gear comprises a helical lead screw at a distal end of the first shaft.

In a further embodiment, the torque conversion mechanism further comprises a spline connector configured to couple to the helical lead screw such that rotation of the first shaft causes the spline connector to rotate and to move linearly along the first shaft.

In a still further embodiment, the spline connector is further configured such that linear movement of the spline connector along the first shaft adjusts the phase angle between the crankshaft gear and the control shaft gear to thereby increase or decrease the compression ratio of the engine.

In a yet further embodiment, the torque conversion mechanism further comprises a spring stack configured to be compressed by the spline connector.

In one embodiment, when the torque received by the control shaft gear from the control shaft increases at higher loads, the spline connector moves in a first direction with increased linear force and compresses the spring stack, wherein the movement of the spline connector in the first direction adjusts the phase angle such that the compression ratio decreases.

In another embodiment, when the torque received by the control shaft gear from the control shaft decreases at lighter loads, the spring stack expands and moves the spline connector in a second direction opposite the first direction, wherein the movement of the spline connector in the second direction adjusts the phase angle such that the compression ratio increases.

In still another embodiment, the variable compression ratio phaser further comprises a control piston that limits the movement of the spline connector to moving only in the first direction when the torque received by the control shaft gear from the control shaft increases at higher loads.

In yet another embodiment, the control piston limits the movement of the spline connector to moving only in the second direction when the torque received by the control shaft gear from the control shaft decreases at lighter loads.

In a further embodiment, the control piston is hydraulically active and is controlled by a position of a hydraulic check valve.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

This present disclosure proposes an apparatus with a new method of actuation for retarding or advancing the eccentric shaft on a variable compression ratio (VCR) engine to achieve a desired compression ratio. The disclosed apparatus utilizes the torque oscillations present in the 6-bar linkage mechanism to either increase or decrease the compression ratio. By utilizing the torque in the system, a high power actuator (e.g., an electric motor, hydraulic pump) may be eliminated, thereby providing a lower cost solution with package and complexity advantages.

The disclosed apparatus comprises a torque-activated VCR phaser that utilizes the existing energy in the linkage to actuate the system. More specifically, the arrangement of simple machine elements, such as lead screws or ball screws, splines, and springs, provide a competitive advantage over current solutions that utilize electric motors and high ratio gearboxes. Utilizing the torque oscillation eliminates the need for these actuators and enables the high instantaneous power to be utilized for phasing, achieving the compression ratio (CR) change quickly.

The present disclosure describes a device that converts torque into a linear force via a helical lead screw that can direct power to phase the control shaft relative to the crankshaft in either direction, depending on the oil control valve (OCV) orientation relative to a hydraulic check valve. The known alternatives to this engine include high ratio gearboxes (i.e., harmonic drive, wave strain gear, cycloidal drive) coupled to an electric or hydraulic motor.

Figure 1:
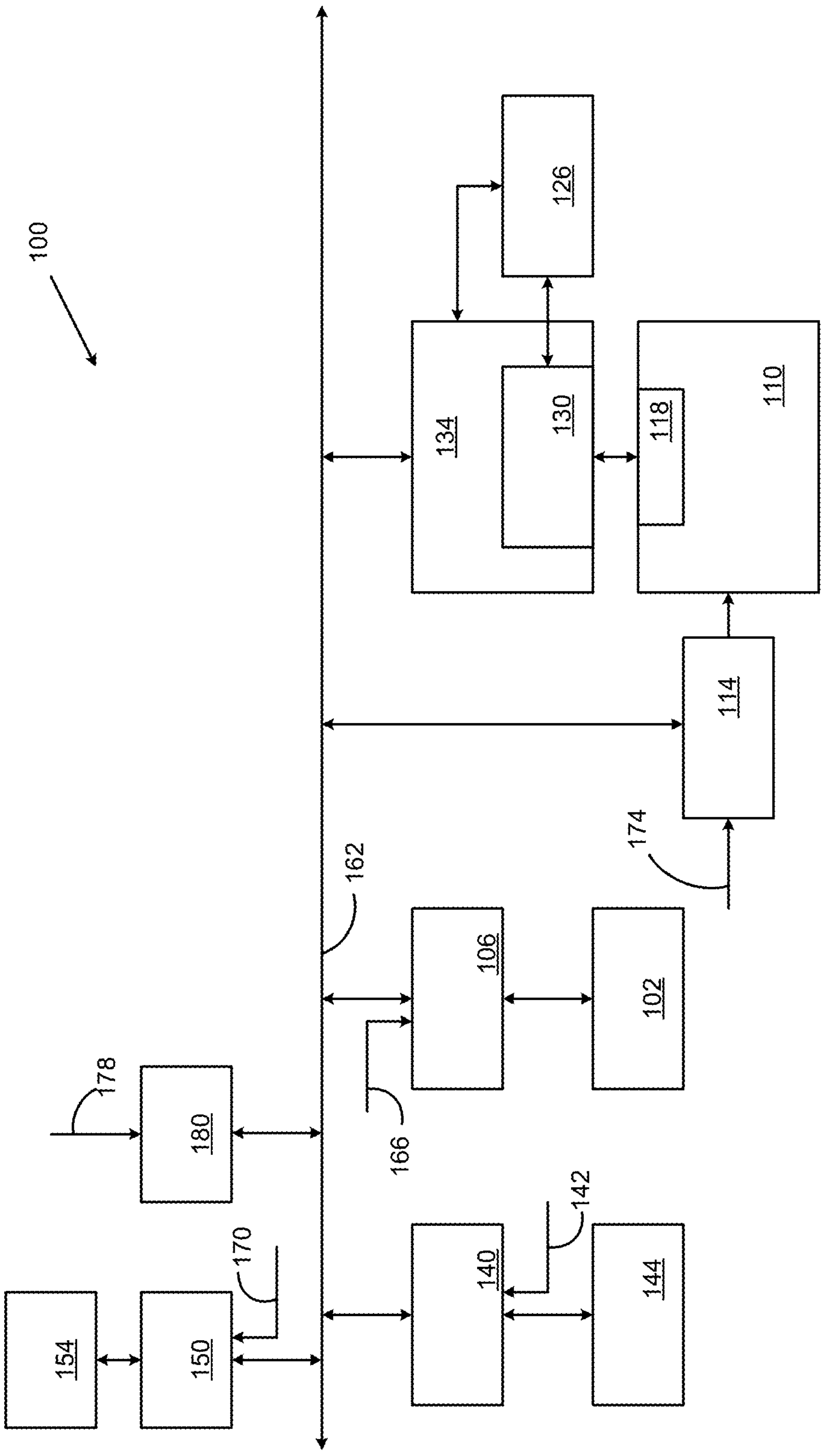
FIG. 1 is a functional block diagram of an exemplary vehicle system that includes a torque-activated variable compression ratio (VDR) phaser according to the principles of the present disclosure

FIG. 1 is a functional block diagram of an exemplary vehicle system 100 that includes a torque-activated variable compression ratio (VCR) phaser according to the principles of the present disclosure. While a vehicle system for a hybrid vehicle is shown and described, the present disclosure is also applicable to non-hybrid vehicles incorporating only an internal combustion engine. Also, while the example of a vehicle is provided, the present application is also applicable to non-automobile implementations, such as boats and aircraft.

An engine 102 combusts an air/fuel mixture to generate drive torque. An engine control module (ECM) 106 controls the engine 102 based on one or more driver inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy may charge a battery 126 via a power control device (PCD) 130. When acting as a motor, an electric motor generates torque that supplements or replaces torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system. An electronic brake control module (EBCM) 150 may selectively control brakes 154 of the vehicle.

Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

According to an exemplary embodiment of the present disclosure, the engine 102 may include a 6-bar linkage mechanism and a variable compression ratio (VCR) phaser that utilizes the torque oscillations present in the 6-bar linkage mechanism to either increase or decrease the compression ratio. Using the system torque in this manner eliminates the need for a high power actuator (e.g., an electric motor, hydraulic pump).

Figure 2:
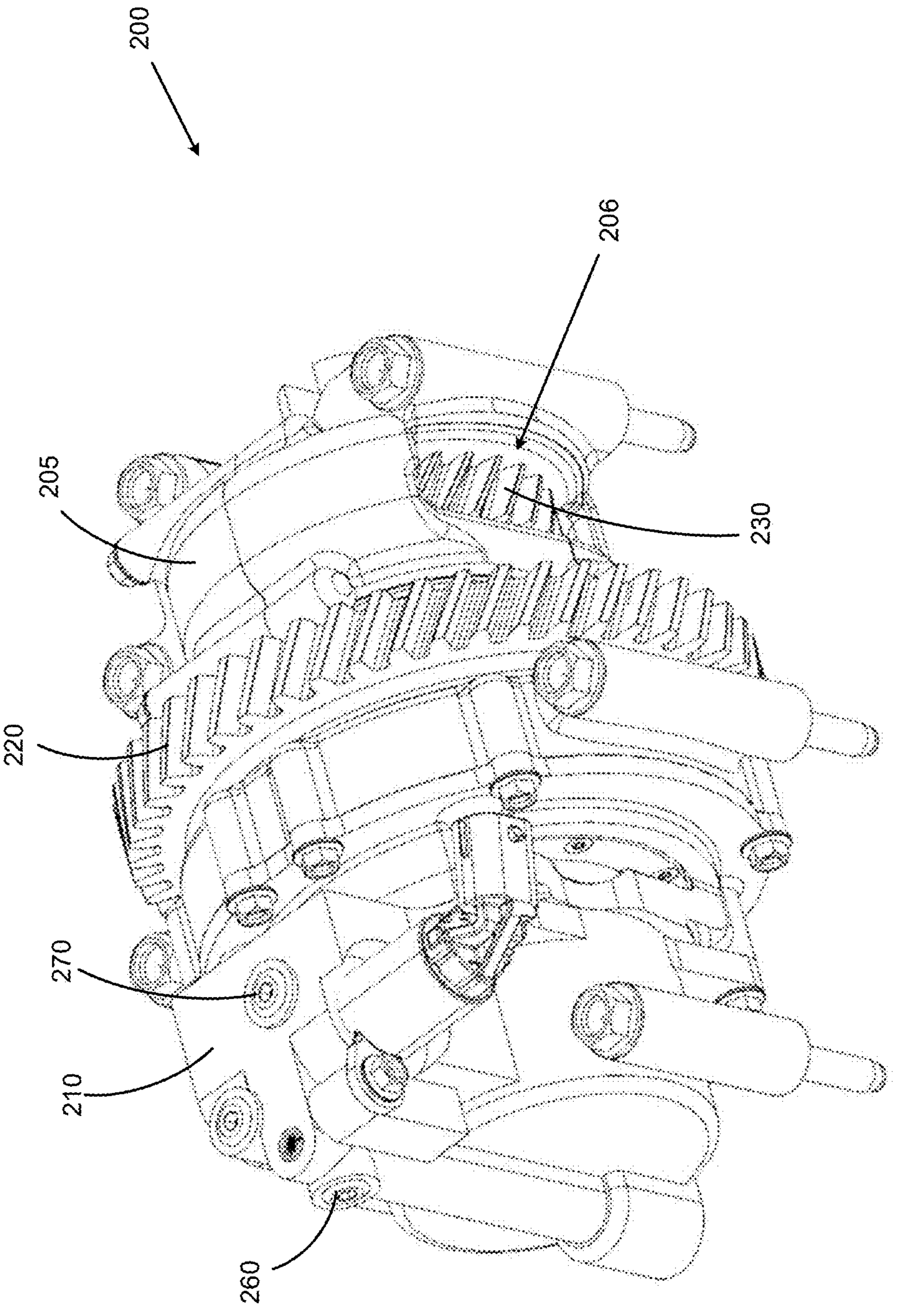
FIG. 2 is a perspective view of the exterior of a torque-activated variable compression ratio (VCR) phaser according to an embodiment of the present disclosure.

FIG. 2 is a perspective view of the exterior of a torque-activated variable compression ratio (VCR) phaser 200 according to an embodiment of the present disclosure. VCR phaser 200 comprises a housing 205, a housing 210, a crank gear 220, and a control (or eccentric) gear 230. Crank gear 220 engages with the main crankshaft of the engine 102 and control gear 230, which is visible through opening 206, engages with the secondary (or control or eccentric) shaft. The VCR phaser 200 further includes an oil control valve (OCV) 260 and a hydraulic control valve 270.

The VCR phaser 200 indexes the phase angle between the crankshaft and the control shaft to vary (or control) the compression ratio. As will be described below, the VCR phaser 200 converts torque into a linear force via a helical lead screw that can direct power to phase the control shaft relative to the crankshaft in either direction, depending on the oil control valve (OCV) 260 orientation relative to a hydraulic check valve 270.

Figure 3:
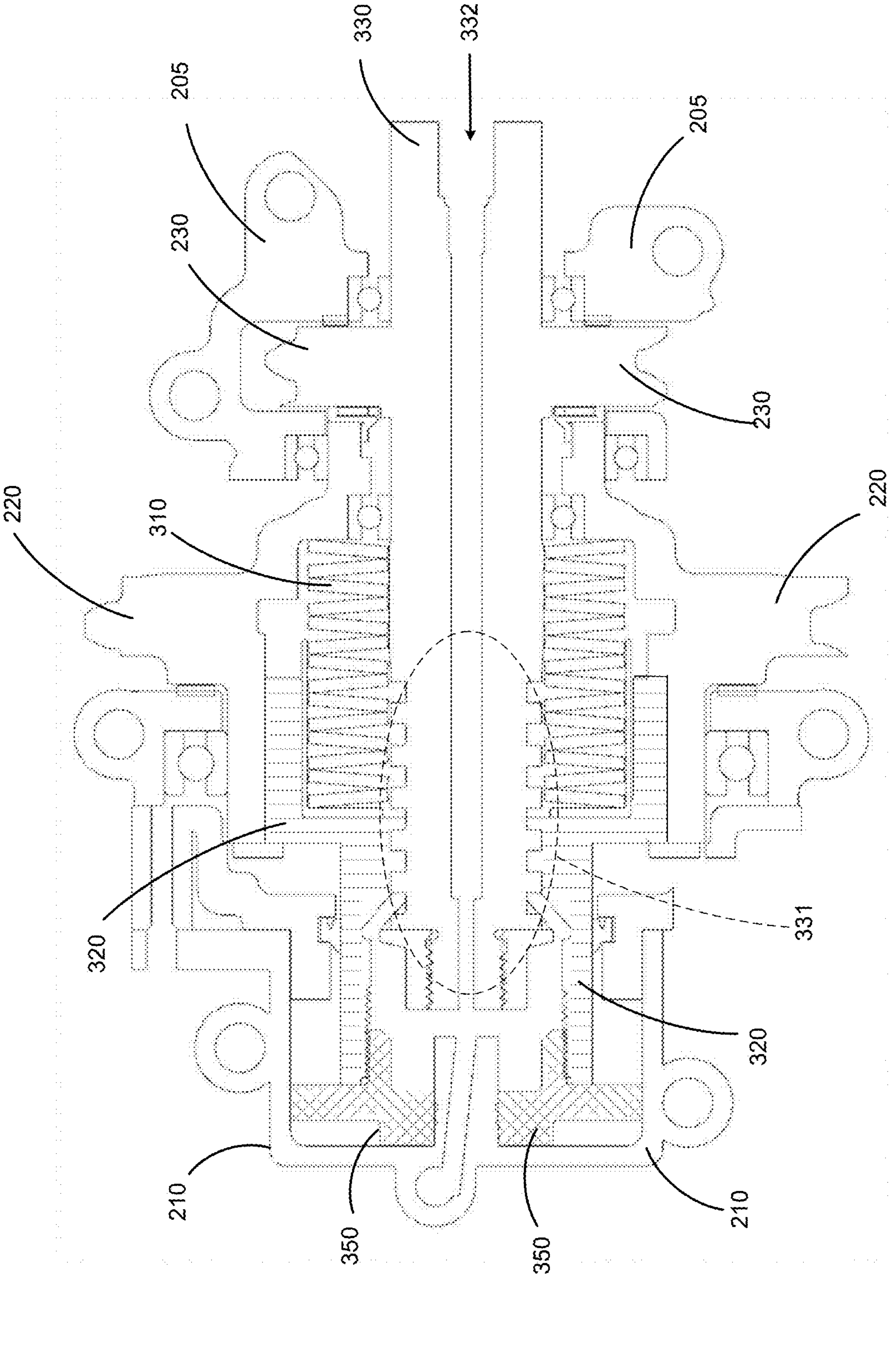
FIG. 3 is a cross-sectional view of a torque-activated variable compression ratio (VCR) phaser according to an embodiment of the present disclosure.

FIG. 3 is a cross-sectional view of a torque-activated variable compression ratio (VCR) phaser 200 according to an embodiment of the present disclosure. VCR phaser 200 comprises a Belleville spring stack 310, a spline connector 320, a shaft 330, a shaft 330, and a piston 350. The control gear 230 is mounted on the shaft 330. At one end, the shaft 330 comprises a 45° helical lead screw 331 (generally indicated by a dashed oval) that meshes with threading on the interior of the spline connector 320.

The spline connector 320 is shaded with a vertical line pattern in FIG. 3. The spline connector 320 encircles the shaft 330 proximate the lead screw 331 portion of the shaft 330. A wider portion of the spline connector 320 encircles the spring stack 310. The outer diameter (or surface) of the spline connector 320 comprises a straight spline that meshes with the crank gear 220.

The interior of the shaft 300 comprises a channel 332 that may be used to inject lubricants. In an exemplary embodiment, the piston 350 is hydraulically controlled and limits the displacement of the spline connector 320 when it is driven to the left by the spring stack 310. The piston 350 is shaded with a crisscrossing line pattern in FIG. 3.

In FIG. 3, the power flow direction is such that the control (or eccentric) shaft of the engine 102 adds power back to the crankshaft through VCR phaser 200. Thus, control gear 230 receives torque from the eccentric shaft of the engine 102. The control gear 230 transfers the torque to the shaft 330, which then drives the spline connector 320 to the left via the lead screw 331. At the same time, the straight spline of the spline connector 320 transfers the torque to the crank gear 220, which adds the torque back to the crankshaft of the engine 102. The spring stack 310 applies a large bias in one direction. The spring stack 310 is disposed between the spline connector 320 and the crank gear 220.

For efficiency reasons, the engine 102 operates at high compression ratio at light loads. However, for peak power reasons, the engine 102 operates at low compression ratio at high loads. In FIG. 3, the spline connector 320 is pushed all the way to the left, indicating the system is at the highest compression ratio for efficiency (i.e., light load). In this state, the torque on the control gear 230 is relatively low due to the light load. Because the torque is relatively low, the linear force created on the spline connector 320 by the 45° helical lead screw 331 is also relatively low and the spring stack 310 forces the spline connector 320 all the way to the left against the hard stop.

However, as the load increases, the torque on the control gear 230 increases, which in turn increases the linear force generated by the 45° helical lead screw 331. As the linear force increases, the spring stack 310 compresses and the shaft 330 drives the spline connector 320 to the right. This allows the control gear 230 to advance relative to the crank gear 220. Thus, increasing loads increase compression of the spring stack 310 until the lowest compression ratio is reached under full load operation.

In an exemplary embodiment, the VCR phaser 200 enables the control shaft gear to advance +/−30 degrees relative to the crankshaft gear. Also, in an exemplary embodiment, the spline connector 320 in the VCR phaser 200 may traverse approximately 15 mm between a high compression ratio state and a low compression ratio state.

Figure 4:
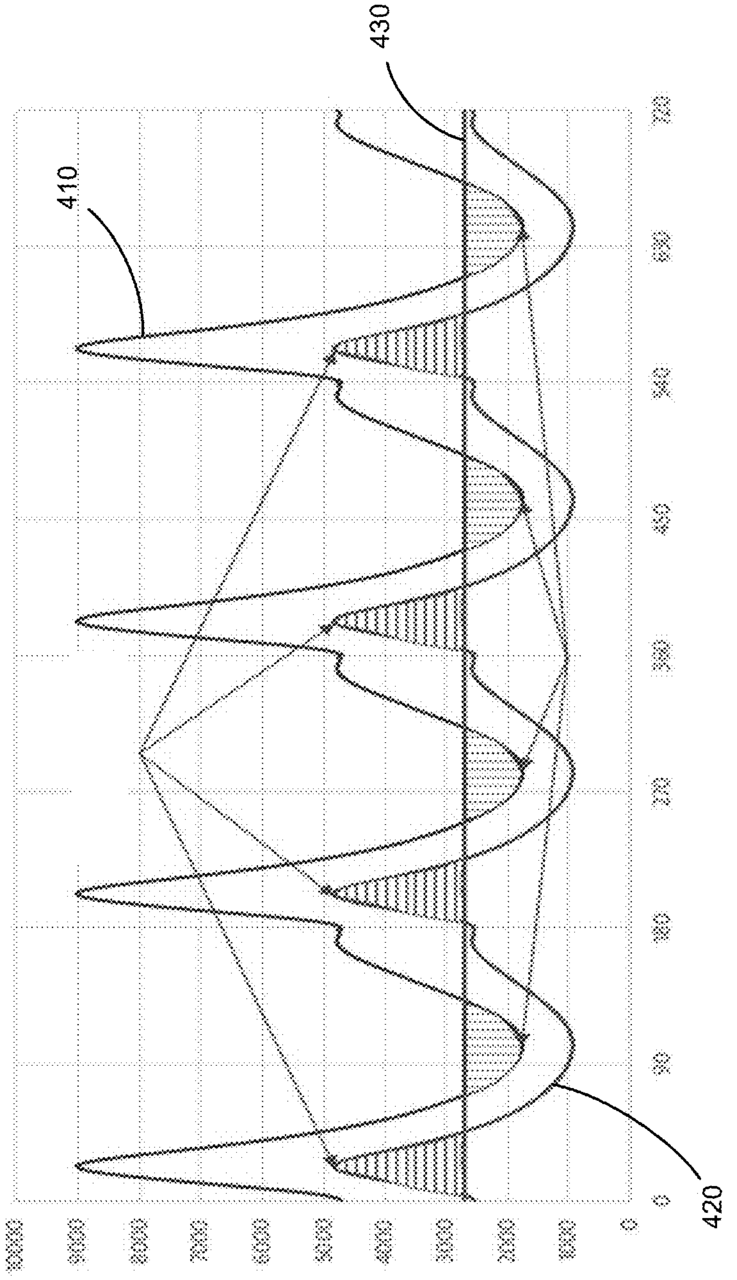
FIG. 4 is a graph illustrating the dynamic torque profile of a torque-activated variable compression ratio (VCR) phaser according to an embodiment of the present disclosure.

FIG. 4 is a graph illustrating the dynamic torque profile of a torque-activated variable compression ratio (VCR) phaser 200 according to an embodiment of the present disclosure. As noted above, the piston 350 is hydraulically controlled and limits the displacement of the spline connector 320 when it is driven to the left by the spring stack 310. According to the principles of the present disclosure, the hydraulic check valve 270 may control the operation of the piston 350.

In FIG. 4, the vertical axis or Y-axis represents spring forces in Newtons (N) for different compression ratios. The torque or linear force oscillates about the spring stack force. Line 430 represents an exemplary spring stack force of 3000 N. Thus, there are periods of time where the linear force is greater than the spring force and periods of time where the linear force is less than the spring force.

Curve 420 in FIG. 4 oscillates above and below the line 430. The regions below the curve 420 and above the line 430 are shaded by a horizontal line pattern and indicate regions where the hydraulic check valve 270 may be set so that the compression ratio decreases and the spline connector 320 is driven to the right hand side. When the curve 420 falls below the line 430, the check valve 270 controls the piston 350 to prevent the spline connector 320 from moving back to the left. Thus, each region shaded by a horizontal line pattern indicates the spline connector 320 moves (or ratchets) only to the right, thereby decreasing the compression ratio for higher loads.

Conversely, the regions above the curve 410 and below the line 430 are shaded by a vertical line pattern and indicate regions where the hydraulic check valve 270 may be set so that the compression ratio increases and the spline connector 320 is driven to the left hand side. When the curve 410 falls below the line 430, the check valve 270 controls the piston 350 to prevent the spline connector 320 from moving back to the right. Thus, each region shaded by a vertical line pattern indicates the spline connector 320 moves (or ratchets) only to the left, thereby increasing the compression ratio for lighter loads. For steady state operation, the hydraulic check valve 270 may be set to lock the piston 350 in place so that the compression ratio does not change.

Those skilled in the art will recognize that the piston 350 need not be controlled by hydraulics. In alternate embodiments, an electric motor, for example, may be used to control the piston 350.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A variable compression ratio phaser configured to control a compression ratio of an engine having a crankshaft and a control shaft, the variable compression ratio phaser comprising:

a control shaft gear that is configured to mesh with a first gear on the control shaft of the engine and to receive torque from the control shaft and that is connected to a torque conversion mechanism;

a crankshaft gear that is configured to mesh with a second gear on the crankshaft of the engine and to deliver torque to the crankshaft and that is connected to the torque conversion mechanism; and the torque conversion mechanism, wherein the torque conversion mechanism is configured to receive torque from the control shaft via the control shaft gear and to convert the torque to a linear force that changes the compression ratio of the engine via the crankshaft gear.

2. The variable compression ratio phaser of claim 1, wherein the linear force from the torque conversion mechanism phases the control shaft relative to the crankshaft to thereby increase or decrease the compression ratio of the engine.

3. The variable compression ratio phaser of claim 1, wherein the linear force from the torque conversion mechanism adjusts a phase angle between the crankshaft gear and the control shaft gear to thereby increase or decrease the compression ratio of the engine.

4. The variable compression ratio phaser of claim 3, wherein the torque conversion mechanism comprises a first shaft on which the control shaft gear is mounted, the first shaft configured to rotate with the control shaft gear.

5. The variable compression ratio phaser of claim 4, wherein the first shaft on which the control shaft gear comprises a helical lead screw at a distal end of the first shaft.

6. The variable compression ratio phaser of claim 5, wherein the torque conversion mechanism further comprises a spline connector configured to couple to the helical lead screw such that rotation of the first shaft causes the spline connector to rotate and to move linearly along the first shaft.

7. The variable compression ratio phaser of claim 6, wherein the spline connector is further configured such that linear movement of the spline connector along the first shaft adjusts the phase angle between the crankshaft gear and the control shaft gear to thereby increase or decrease the compression ratio of the engine.

8. The variable compression ratio phaser of claim 7, wherein the torque conversion mechanism further comprises a spring stack configured to be compressed by the spline connector.

9. The variable compression ratio phaser of claim 8, wherein, when the torque received by the control shaft gear from the control shaft increases at higher loads, the spline connector moves in a first direction with increased linear force and compresses the spring stack, wherein the movement of the spline connector in the first direction adjusts the phase angle such that the compression ratio decreases.

10. The variable compression ratio phaser of claim 9, wherein, when the torque received by the control shaft gear from the control shaft decreases at lighter loads, the spring stack expands and moves the spline connector in a second direction opposite the first direction, wherein the movement of the spline connector in the second direction adjusts the phase angle such that the compression ratio increases.

11. The variable compression ratio phaser of claim 10, further comprising a control piston that limits the movement of the spline connector to moving only in the first direction when the torque received by the control shaft gear from the control shaft increases at higher loads.

12. The variable compression ratio phaser of claim 11, wherein the control piston limits the movement of the spline connector to moving only in the second direction when the torque received by the control shaft gear from the control shaft decreases at lighter loads.

13. The variable compression ratio phaser of claim 11, wherein the control piston is hydraulically active and is controlled by a position of a hydraulic check valve.

* * * * *